Patented Aug. 23, 1927.

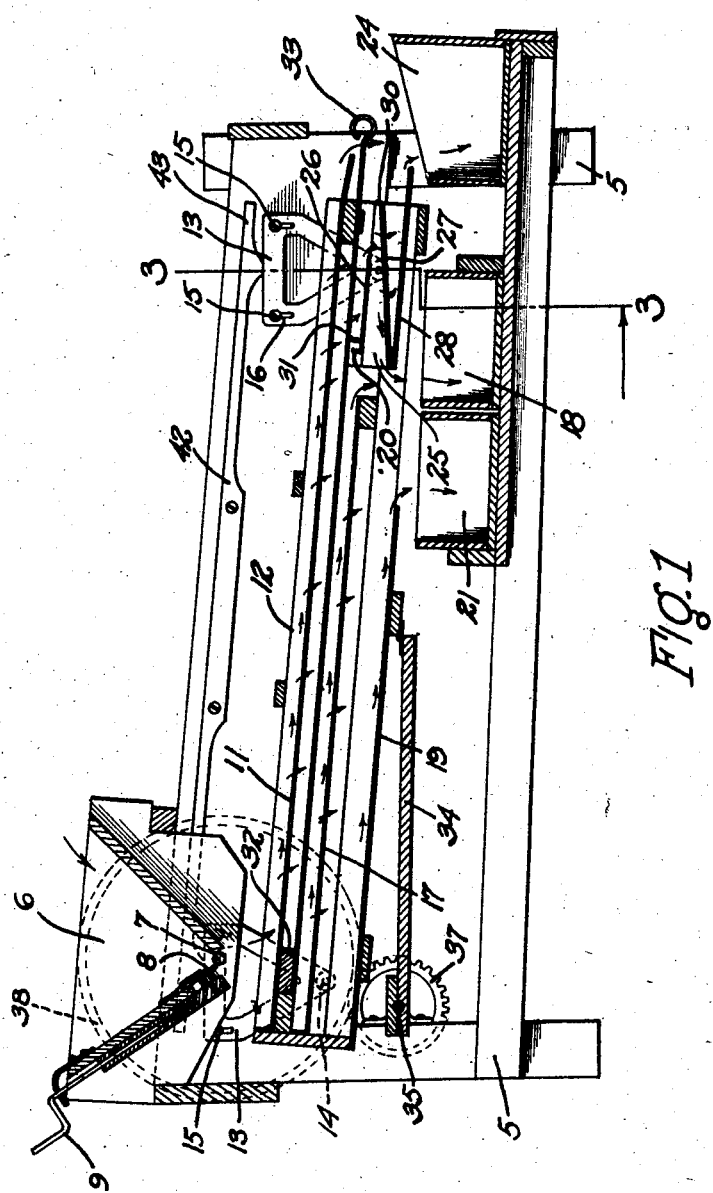

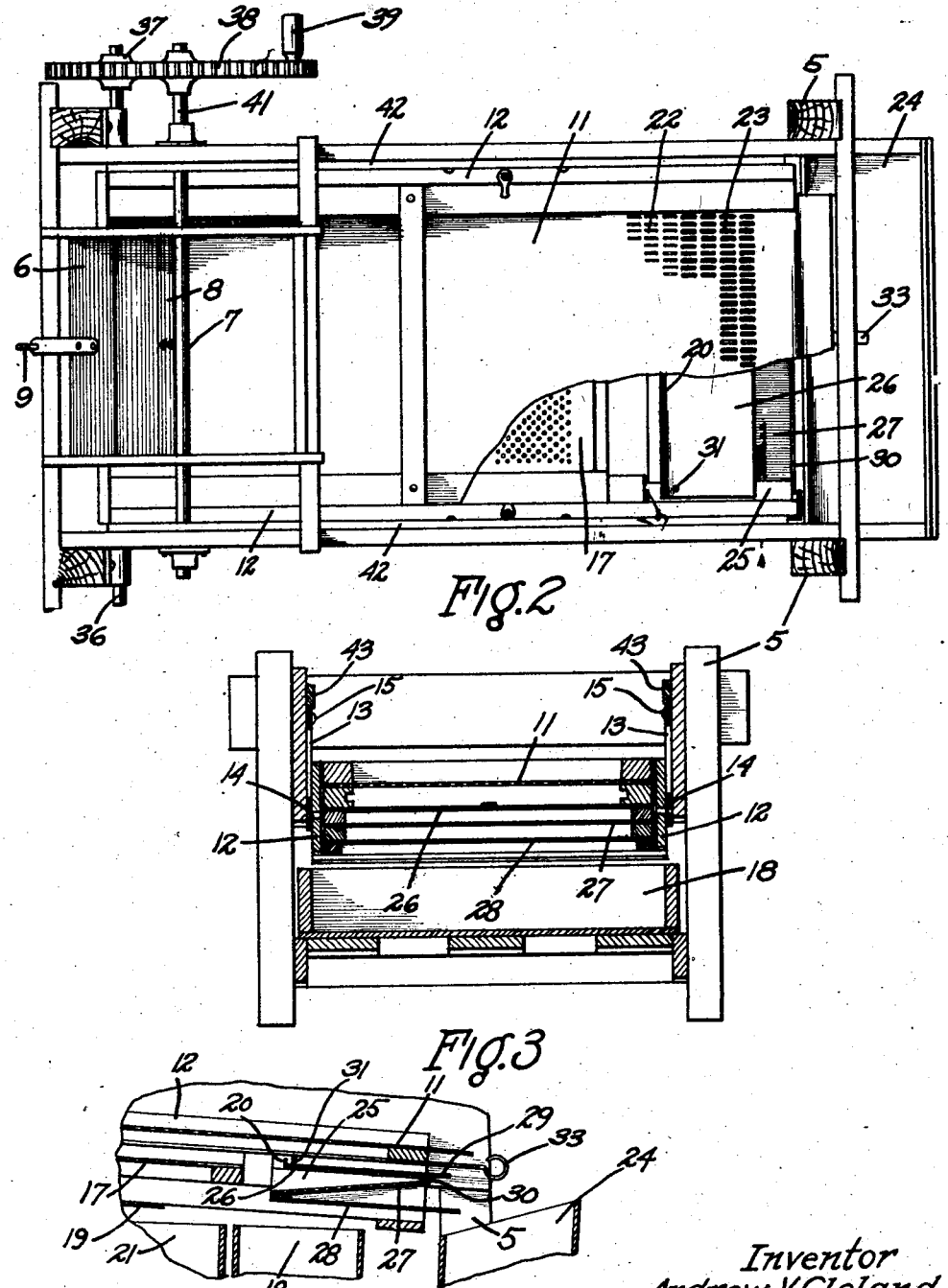

1,639,926

UNITED STATES PATENT OFFICE.

ANDREW V. CLELAND, OF MINNEAPOLIS, MINNESOTA.

FLAX-TESTING MACHINE.

Original application filed July 18, 1923, Serial No. 652,422. Divided and this application filed September 2, 1924. Serial No. 735,370.

This invention relates to improvements in machines particularly adapted for use in testing samples of flax taken from shipments received at grain elevators or warehouses, the purpose of testing such samples being to ascertain the amount of dockage and amount of flax contained in the shipment The particular object of the invention is to provide a flax testing machine having a plurality of sieves mounted therein adapted for oscillatory and vibratory movement, over which the sample of flax is passed to separate therefrom the foreign materials such as small weed seeds, cockle, sticks, etc. commonly known as dockage.

A further object of the invention is to provide a flax testing machine which can be quickly and easily adapted for varying sizes of flax seeds so that a sample containing a large percentage of full, plump seeds can be graded with the same efficiency as a sample where the seeds run smaller in size.

A further and more specific object is to provide such a machine having the sieves thereof mounted in a frame which is supported by means of double-acting links which are so constructed and arranged within the frame of the machine as to impart an oscillatory and vibratory movement to the sieves when the operating mechanism is actuated.

Other objects will more fully appear from the following description and the accompanying drawings and will be pointed out in the annexed claims.

In the drawings there has been disclosed a structure designed to carry out the various objects of the invention but it is to be understood that the invention is not confined to the exact features shown as various changes may be made within the scope of the claims which follow.

In the accompanying drawings forming a part of the specification,

Figure 1 is a view in sectional elevation of my improved flax testing machine;

Figure 2 is a plan view of Figure 1 showing the larger elongated perforations provided in the upper sieve adjacent the discharge end thereof;

Figure 3 is a cross sectional view on line 3—3 of Figure 1, and

Figure 4 is a detail sectional view of the discharge end of the machine showing the means provided for rendering inoperative the relatively shorter inclined sieve mounted adjacent the discharge end thereof.

The novel flax testing machine shown in the accompanying drawings comprises a main frame 5 having a hopper 6 mounted at one end thereof as shown in Figure 1. This hopper is provided with a discharge opening 7 which preferably extends the full width of the hopper and the size of which may be regulated by means of a slide 8 having an operating crank 9 connected thereto whereby such opening may be increased or decreased in size to permit more or less flax to be fed onto a scalping sieve 11 of an oscillating shoe 12 arranged at an incline beneath the hopper. This shoe is supported in the main frame of the machine by means of triangular-shaped links or plates 13 pivotally connected at their lower ends to the shoe by pivots 14 and having their upper ends secured to the side walls of the frame by means of fixed pins 15. The links 13 are provided with elongated apertures 16 to receive the pins 15 so that when the shoe 12 is oscillated upon the links or plates 13, a slight jarring movement will be imparted thereto. This is caused by the spacing of the pins 15 and the elongated apertures 16. Referring to Figure 1, it will be seen that as the shoe is oscillated the plates 13 will oscillate alternately upon one pin and then the other, thereby causing the pivot pin 14, and therefore the shoe to be slightly raised at the end of each stroke thereby imparting thereto a jarring or gyrating movement which will cause the flaxseeds to fall or drop through the scalping sieve 11 onto a secondary perforated plate 17 mounted in the shoe and arranged in spaced parallel relation to the scalping sieve 11. The perforations in the plate 17 are of a relatively smaller size than the mesh of the scalping sieve 11 so that the flaxseeds will not pass therethrough but will be conveyed to the end thereof and discharged into a receptacle 18. The finer material, such as weed seeds and small particles of dirt will pass through the perforated plate 17 and will be discharged onto an imperforate or solid plate 19 arranged therebeneath from which it will be discharged into a receptacle 21 preferably arranged adjacent the flaxseed receptacle 18.

The upper scalping sieve 11 is preferably removably mounted in the shoe and is provided with an upper group of longitudinal slots or openings 22 and a lower group 23 corresponding in shape to those of the upper group 22 but are made wider and larger so as to allow the full, plump flaxseeds which are too large to pass through the openings 32 to pass therethrough instead of being discharged over the end of the sieve into a waste receptacle 24 adapted to receive the coarser material such as the sticks etc. Means are provided beneath the group of enlarged openings 23 in the sieve 11 to receive the larger flaxseeds and convey them to the flaxseed receptacle 18. Such means preferably consists in the provision of a rectangular frame 25 which is removably mounted in the shoe 12. A plate 26, having an upturned flange 20, is mounted in the upper portion of this frame adapted to receive the larger flaxseeds passing through the enlarged openings 23 of the sieve 11. From this plate, the seeds are discharged onto an inclined perforated plate 27, also having an upturned flange 30, and which is arranged in such a manner as to convey the seeds falling thereon back to the receptacle 18 as indicated by the arrows. This plate is preferably of a larger size mesh than the perforated plate 17 in the upper end of the shoe. An imperforate plate 28 is mounted in the frame 25 beneath the plate 27 and functions to receive the finer material passing through the inclined plate 27 and conveying such material to the waste receptacle 24 at the tail-end of the machine. Should the sample of flaxseeds being tested be of substantially uniform size so that practically all of the flaxseeds will pass through the smaller openings 22 in the upper portion of the scalping sieve 11, then it may be desirable not to use the inclined perforated plate 27 mounted in the frame 25. Means are therefore provided for rendering the plate 27 inoperative which consists in the provision of an imperforate plate 29 adapted to be mounted on top of the upper plate 26, as particularly shown in Figure 4. This plate 29 is relatively longer than the fixed plate 26 of the frame 25 so as to cover the gap provided between the end of the plate 26 and the perforated plate 27, thereby preventing any material dropping through the enlarged openings 23 of the scalping sieve 11 from being discharged onto the perforated plate 27, such material instead being discharged over the plate 29 into the waste receptacle 24. The plate 29 is removably mounted upon the fixed plate 26 of the frame 25 by means of pins 31 secured to the frame 25. A brush or scraper 32 is slidably mounted beneath the scalping sieve 11 and is operable by means of a hand-grip 33 to scrape or brush the under side of the sieve in order to keep its meshes clean.

The means provided for oscillating the shoe 12 consists of a pitman 34 having one end pivotally connected to the bottom of the shoe and having its other end connected to a crank 35 provided on a shaft 36. The shaft 36 is operable by means of a pinion 37 meshing with a gear 38 having an operating handle 39 secured thereto as shown in Figure 2. The larger gear 38 is mounted upon a transverse shaft 41 which preferably extends through the discharge opening 7 at the bottom of the hopper as shown in Figures 1 and 2. Thus, when the machine is in operation and the shaft 41 is rotating, it will agitate the flax sufficiently to cause it to be fed through the opening between the shaft and the slide 8 in an even and uniform flow.

In the practical operation of this novel flax-testing machine, I have found that sufficient jar or gyration might be imparted to the shoe 12 by the revolution of the crank shaft 36 to cause the seeds to be thrown off the sieve 11 and therefore defeat the operation of the machine. To limit, therefore, this jarring or gyrating action of the shoe, I prefer to provide means for holding the triangular plates 13 down with a yielding pressure so that the shoe 12 will not have so much freedom of movement. This yieldable holding means preferably consists of wooden strips 42 secured at their middle portions to the frame of the machine and have spring ends 43 which are adapted to bear on the upper edges of ends of the plates 13 thereby to yieldably resist the upward movement thereof with the resultant retardation of the gyrations of the shoe 12, and whereby preventing the seeds from being thrown off the sieve by too rapid or extreme vibration thereof.

In the operation of this novel flax testing machine, the sample of flax to be tested is placed in the hopper 6 and fed therefrom onto the upper scalping sieve 11. As the flaxseeds and other material downwardly travel over the inclined surface of the sieve 11 all of the finer material and also the flaxseeds will pass through this sieve as indicated by the arrows, and drop onto the secondary sieve, or perforated plate 17 arranged therebeneath. The coarser material such as sticks, oat kernels and foreign seeds larger and of different form than the flaxseed, which are too large to pass through the perforations or openings 22 in the sieve 11 will be conveyed to the lower end thereof and discharged into the waste receptacle 24 as indicated by the arrow. The larger or plump flaxseeds, however, will not be discharged over the end of this sieve but will pass through the enlarged openings 23 at the lower end thereof and will be discharged onto the plate 26, thence onto the perforated plate 27 from which it will be discharged into the flaxseed receptacle 18. The flaxseeds and finer material passing through the upper portion of the scalping sieve 11 will be discharged onto the perforated plate 17, which, having a relatively finer mesh than the sieve 11, will allow only the finer material such as small weed seeds, particles of dirt, etc., to pass therethrough while the flaxseeds will be conveyed to the lower end thereof and discharged into the receptacle 18. The finer material passing through this plate will be received by the solid or imperforate plate 19 from which it will be conveyed to the waste receptacle 21 as indicated by the arrows. After the entire sample of flax has been passed through the machine, the operator will take the contents of the waste receptacles 21 and 24 and also the clean seed in the receptacle 18 and weigh them, after which he can readily determine the proportion of waste or dockage contained in the shipment from which the sample was taken, which will thereby enable him to accurately ascertain the proper percentage of dockage to be charged against the shipment.

This application is a division of my pending case for flax testing machines #652,422, filed July 18, 1923.

I claim as my invention:

1. A flax testing machine comprising a frame, an oscillating shoe mounted therein, a scalping sieve mounted in said shoe and having a group of perforations near its lower end which are larger than those in the upper portion of said sieve to allow the larger seeds passing over the upper portion of the sieve to pass through, a sieve mounted in said shoe beneath said scalping sieve to receive the seed and fine material falling through the upper portion of said scalping sieve, the tailings of said scalping sieve being discharged from the lower end thereof, the finer seeds falling upon said second named sieve, and a means beneath the group of larger perforations for separating the larger seeds received through the larger perforations of the scalping sieve, and delivering the same substantially at the point of delivery of the second named sieve.

2. A flax testing machine comprising a frame, an oscillating shoe mounted therein, a scalping sieve mounted in said shoe and having a group of perforations near its lower end which are larger than those in the upper portion of said sieve, a sieve mounted in said shoe beneath said scalping sieve to receive the seed and fine material falling through the upper portion of said scalping sieve, the tailings of said scalping sieve being delivered, over the lower end thereof said second sieve discharging the finer seeds received from the upper portion of said scalping sieve, and means beneath the group of larger perforations for directing the seeds falling therethrough away from the refuse and fine material into said waste receptacle, said means comprising a plate whereon the large seeds and material falling through said larger perforations are delivered, an inclined screen section arranged to receive the seeds and other material from said plate, and a plate beneath said sieve section to receive and discharge the waste material to mingle with the tailings from said scalping sieve.

3. The combination with an oscillating shoe, of a scalping sieve mounted therein and having a group of perforations near its lower end which are larger than the other perforations in said sieve and adapted to allow the passage of large plump kernels therethrough which are too large to pass through the other perforations in said sieve, means for receiving the finer seeds falling through the upper portion of said sieve, and means beneath said larger perforations for receiving and directing the large seeds away from the tailings and the refuse material.

4. The combination with an oscillating shoe, of a sieve mounted therein and having a group of comparatively large openings near its lower end through which the plump seed kernels may fall which are too large to pass through the upper openings in said sieve, a plate removably mounted beneath the lower portion of said sieve and said group of larger perforations, and a sieve section in said frame adapted to receive the large plump seed kernels from one end of said plate, and a second plate removably mounted upon the first mentioned plate, to temporarily prevent deposit of large seeds upon said last mentioned sieve.

5. The combination with a shoe and a sieve mounted therein having a group of larger perforations near its lower end through which the plump kernels too large to pass through the other perforations in said sieve may fall, the tailings passings off the lower end of said sieve, means for directing the seeds falling through the larger perforations away from said tailings, and a removable imperforate plate mounted beneath said larger perforations for directing the material falling therethrough into said waste receptacle.

6. The combination with a frame, of an oscillating shoe mounted therein, a sieve mounted in said shoe, plates pivotally connected with said shoe and having vertical slots therein to receive pins in said frame, and means arranged to yieldingly bear on said plates and resist upward movement thereof.

7. The combination with a frame, of an oscillating shoe mounted therein, a sieve mounted in said shoe, plates pivotally connected with said shoe and having vertical slots therein to receive pins in said frame, and spring bars arranged to bear on said plates and resist upward movement thereof.

8. The combination with a shoe and a sieve mounted therein having a group of larger perforations near its lower end through which the plump kernels too large to pass through the upper perforations in said sieve may fall, the refuse and tailings being discharged over the end of the sieve, of a second sieve located beneath said first named to receive the fine seeds and material falling through the upper portion of said first named sieve, said second sieve terminating short of the lower section of said first named sieve containing the larger perforations, a perforate member arranged below the larger openings in said first named sieve to receive the material therefrom, and an imperforate member adapted to render said perforate member operative or inoperative as desired.

9. The combination with a shoe and a sieve mounted therein having a group of perforations in its upper portion and a group of larger perforations in its lower portion through which said seeds of different sizes may fall, a sieve arranged beneath the upper portion of first named sieve to receive the fine seeds and material therefrom, a plate positioned beneath the larger perforations of said sieve and whereto the full or plumper kernels are delivered, a perforated plate arranged to receive such larger or plumper kernels, and means for diverting the seeds and material passing through the larger openings away from said perforated plate.

10. The combination with an oscillating shoe, of a sieve mounted therein and having a group of comparatively small openings in its upper portion and a corresponding group of larger openings in its lower portion, means for receiving the fine seeds and material falling through the upper portion of said sieve, and means for separating and collecting the larger plumper seeds falling through the larger openings of said sieve.

In witness whereof, I have hereunto set my hand this 21st day of August, 1924.

ANDREW V. CLELAND.